United States Patent [19]

Joulin

[11] 4,357,356

[45] Nov. 2, 1982

[54] BREAD AND METHOD FOR MAKING SAME

[76] Inventor: Gerard Joulin, 44 rue de Poutoise, 95.870 Bezons, France

[21] Appl. No.: 140,819

[22] Filed: Apr. 16, 1980

Related U.S. Application Data

[63] Continuation-in-part of Ser. No. 949,030, Oct. 6, 1978, abandoned.

[51] Int. Cl.³ .............................................. A21D 17/00
[52] U.S. Cl. ...................................... 426/19; 426/128; 426/412; 426/407
[58] Field of Search ................. 426/19, 106, 118, 128, 426/234, 316, 392, 395, 396, 324, 325, 410, 412, 407

[56] References Cited

U.S. PATENT DOCUMENTS

| | | | |
|---|---|---|---|
| 2,549,595 | 4/1951 | Gregor | 426/19 |
| 3,193,389 | 7/1965 | Dehne et al. | 426/128 |
| 3,419,400 | 12/1968 | Hayhurst et al. | 426/316 |
| 3,542,568 | 11/1970 | Bouyer | 426/128 |

FOREIGN PATENT DOCUMENTS

| | | | |
|---|---|---|---|
| 2305349 | 3/1976 | France | 426/128 |
| 38-6554 | 5/1963 | Japan | 426/19 |
| 1008679 | 11/1965 | United Kingdom | 426/128 |
| 1075455 | 7/1967 | United Kingdom | 426/128 |

Primary Examiner—Raymond N. Jones
Assistant Examiner—Elizabeth A. Hatcher
Attorney, Agent, or Firm—Fisher, Christen & Sabol

[57] ABSTRACT

A method of producing a bread product from dough which does not contain any artificial preservatives includes partially baking the dough at the usual temperature, packing it in hermetic packages under partial vacuum, and sterilizing it while in the hermetic package. The product may be stored indefinitely at ambient temperatures in a condition that enables the user to provide a product having the characteristics of fresh bread by completing the baking step.

9 Claims, 5 Drawing Figures

BREAD AND METHOD FOR MAKING SAME

CROSS-REFERENCE TO OTHER APPLICATIONS

This application is a continuation in part of my copending application Ser. No. 949,030 filed Oct. 6, 1978, now abandoned.

BACKGROUND OF THE INVENTION

The present invention relates to a bread product and to a method for producing same.

Bread products, and particularly so-called "French" bread, are known to tend to get stale rapidly. If, therefore, too much bread is bought, it must either be consumed stale or be thrown away. It may possibly be reheated in the oven before being eaten, but then it dries up, is overcooked and it is hardly appetizing. Consequently, there is a tendency to buy only the quantity of bread which will be consumed in the day, in order to avoid waste, and one may find oneself short if the estimated consumption is less than the actual quantity consumed. This type of situation is often encountered by restaurant owners who never know precisely how much their clientele will consume and who, consequently, buy too much or too little bread.

It is an object of the present invention to remedy this situation and to create a bread product which keeps well, therefore which may be bought in advance for future use and to which, by a simple operation effected at the time of consumption or some time before, the appearance, consistence and flavor of a fresh bread product may be given. It will be readily appreciated that this bread product according to the invention may either replace fresh bread, or serve as a complement therefor. It is thus possible to buy the minimum of fresh bread, corresponding to the estimated minimum consumption in order to avoid waste, since, if the actual consumption is higher, the bread product according to the invention may be rapidly prepared.

U.S. Pat. No. 2,549,595, Japanese Pat. No. 6554/63 or Swiss Pat. No. 569,410 for example disclose a process of preparing bread from a traditional dough which, after the leavening phase, is subjected to a partial baking arrested after structuration but without leading to coloration and the final formation of a brown crust.

Bread of prebaked type is thus produced, which may be conserved for some time in this state and may be subjected to a final baking phase, at that moment provoking the final formation of the brown crust.

However, this bread of prebaked type can only be kept for a few days or stored in a freezer unit.

After a few days at ambient temperature, the bread of prebaked type is rapidly attacked by the sources of outside aggression, particularly by the germs in the ambient medium.

This sensitivity of the prebaked bread to the source of mould is explicable, considering that the prebaked bread having been removed from the oven before it has totally cooked, has conserved more water than totally baked bread contains; in addition, the crust formed by caramelized starch and which constitutes the envelope protecting the bread from the easy penetration of the germs, being only imperfectly formed in the case of prebaked bread, does not constitute a sufficient barrier; all the more so as the prebaked bread being very moist; the dry crust of the bread, on leaving the oven, is rapidly penetrated by the moisture inside the bread and this moist crust cannot constitute a barrier against the germs and mould coming from the outside medium.

It follows that the prebaked bread, being given its short keeping time, unless the conditions are exceptional (such as storage in a freezer unit), has met with only limited interest and has not been developed in practice.

Processes are known for conserving food products over periods of a few weeks or a few months.

In practice, the food product may be packed hermetically in vacuo or in a packing filled with an inert gas, as provided by U.S. Pat. No. 3,419,400.

This technique enables the food product to be removed from the atmospheric oxygen which constitutes in numerous cases a source of attack by oxidation of the food products leading to a stale or rancid taste. However, this technique is not adapted to the case of prebaked bread; in fact, this bread suffers from contamination by germs, mould or the like from which we find on the prebaked bread a moist, starch-based medium which forms a support particularly favorable to the proliferation of the micro-organisms, much more than from the oxidizing atmosphere of the air.

During the period of conservation, it is in fact necessary to avoid any contact between the prebaked bread and a source of contamination that may convey mould or germs on the prebaked bread.

On the other hand, it has been provided to pack bread products in envelopes which are substantially hermetic with respect to the outside medium the packing itself being subjected to a sterilization phase by heat so as to destroy the germs present on the bread and in the atmosphere inside the packing, the bread thus placed in a sterile medium being able to be kept for several weeks or months.

U.S. Pat. Nos. 3,193,389 and 3,542,568 describe a process for packaging bread products subjected to sterilization, but these patents relate to the packaging and sterilization of traditional bread which is totally baked.

Now, experience has shown that these processes, although they were suitable for packaging baked bread in a sterile atmosphere, were not adapted to the conservation of prebaked bread.

In fact, the normally baked bread has a hard crust formed by the caramelization of the outer layer of starch; this hard layer gives the bread its final structure and properties of mechanical strength; furthermore as has been indicated hereinabove, the prebaked bread contains much more water than the conventional, totally baked bread.

Due to these conditions, the prebaked bread does not withstand the operational conditions of sterilization and conservation described in U.S. Pat. Nos. 3,193,389 and 3,542,568.

According to U.S. Pat. No. 3,193,389, the bread, placed in a bag from which substantially all the air is evacuated, is subjected to sterilization at 90° to 100° C. for 15 mins. to 1 hr.; now, although they can be withstood by traditional, normally baked bread, these conditions are inacceptable for bread of prebaked type.

In the first place, the duration and temperature of the sterilization treatment described in U.S. Pat. No. 3,193,389, which conditions are necessary to obtain a pasteurization temperature at the heart of the bread, would provoke in the case of prebaked bread a second baking of the bread, making the prebaked bread lose its properties of prebaked bread and its possibility of reconstituting fresh bread during the final baking prior to consumption.

Above all, the maintaining of the prebaked bread, containing substantially 37% of water, at a temperature of 100° for 15 minutes to 1 hour would provoke the evaporation of a large amount of the water contained in the bread and no bag could withstand the pressure thus produced. The result is that the sterilization conditions, suitable for normally baked bread, are not satisfactory for prebaked bread.

Thirdly, assuming that the prebaked bread in its package was able to withstand the severe sterilization conditions, the bread on leaving the sterilizer, would be contained in a package filled with water vapor and containing only water vapor (since the air was previously removed from the bag before the sterilization stage).

Following the cooling of this package, the water vapor condenses, which has a doubly disastrous effect on the prebaked bread.

The condensation of the water creates a moist interface between the film of the bag and the fragile and light crust of the prebaked bread; the moist medium decomposes the light crust of the prebaked bread which forms a sticky mash, the film of the bag, then sticking to the body of the bread; when the bag is opened, the moistened crust remains stuck to the film of the bag, so that the product is literally peeled like a banana, this creating conditions which are inacceptable for marketing the product.

In the second place, when the condensation of the water eliminates the inner atmosphere within the package, the latter is then subjected to the outer atmospheric pressure which is not balanced by an inner counterpressure; this would be acceptable for a normally baked bread, having its own structure and a sufficient mechanical strength, but the prebaked bread which has only a light temporary structure does not withstand these conditions and under the atmospheric pressure collapses and loses all its shape and appearance.

The solution proposed in U.S. Pat. No. 3,193,389 and consisting in making a partial vacuum (of 0.5 to 0.5 atmosphere) (col. 7, lines 55 to 68 thereof) would not be applicable in the case of prebaked bread; in fact, the residual even partial pressure of the air would be added to the pressure of the water vapor given off during the long sterilization treatment and would certainly burst the package.

Neither is it possible to reduce the sterilization conditions according to U.S. Pat. No. 3,193,389 without limiting the effects of sterilization; in fact, this duration is necessary, taking into account the cooling of at least 6 hours and as much as 15 to 20 hours to which the bread is subjected between baking and sterilization thereof.

U.S. Pat. No. 3,542,568 describes another process of sterilization of bread in a package with a view to conserving it for a long time, wherein a succession of bags forms a continuous string communicating with one another as they pass through the sterilization chamber, thus allowing the evacuation of the heat given off during the sterilization phase towards the upstream bags; the risk of bursting of the bags in the sterilization phase is thus avoided, but this process cannot be applied to the conservation of prebaked bread.

In fact, in the package obtained according to U.S. Pat. No. 3,542,568, the inner atmosphere, on leaving the sterilization chamber and after being sealed, is constituted solely by water vapor.

In this system, the bags being in communication, the vapor given off during the sterilization phase escapes upstream and consequently repels the air present in the bags upstream, with the result that the bags arriving in the sterilization phase are impregnated with the water vapor driven from the preceding bags and which has driven out the initial air.

Under these conditions, the bag, when it is sealed, contains exclusively an atmosphere of water vapor.

The above-mentioned drawbacks are thus found again, namely the vapor, on condensing, moistens the crust and creates an adhesive interface between the envelope and the prebaked bread; in addition, condensation creates an inner vacuum and under atmospheric pressure the prebaked bread subsides. A product is thus obtained which is not commercially presentable.

BRIEF SUMMARY OF THE INVENTION

It is an object of the present invention to remedy these drawbacks and to obtain a prebaked bread presenting all the properties of this type of bread and particularly the possibility for the user to complete final baking phase, immediately before it is consumed, thus obtaining fresh, crusty, tasty bread, this prebaked bread being, however, packed under such conditions that it can be kept for several weeks at ambient temperature, without containing any preservative.

To this end, the invention relates to a process of manufacturing a bread product having a long conservation time, or shelf-life.

According to the invention, the sterilization phase immediately follows the prebaking phase of the bread, without the bread being cooled to below a threshold of the order of 50° C.

Under these conditions, the sterilization phase may be conducted very rapidly and limited to a duration of about 8 minutes, this being sufficient to enable the temperature at the heart of the bread (still hot when it is introduced into the sterilization phase) to rise up to a sufficient temperature to obtain a thorough sterilization, while this duration remains sufficiently limited to avoid a high pressure being built up within the packages, risking bursting thereof.

In addition, at the time when it is placed in its package, the still hot bread renders a certain quantity of water vapor; the degasifying phase, immediately before the closure and sealing of the package, eliminates this water vapor, with the result that the water vapor which will be given off during the sterilization phase comes solely from the heart of the bread; this water vapor given off from the body of the bread during passage to the sterilizer will then be reabsorbed by the bread after cooling; however, the reinjection under sight pressure of a certain quantity of neutral gas, ensures the maintenance, within the package, after cooling, of a gaseous interface which performs a double function: it prevents, firstly, a direct contact of the inner, moist film against the package by the mass of the bread, without provoking the phenomenon of "gluing" of the moist film on the crust. In addition, this slight residual pressure within the package prevents the bread from subsiding under the effects of the atmospheric pressure, after total condensation of the water vapor, secondly, this residual atmosphere of a neutral gas, apart from the physical effects described above, has the advantage of isolating the bread, during the conservation phase, from an overly aggressive oxidizing atmosphere.

The temperature and duration of sterilization may be all the more shortened and limited, thus avoiding the risks of bursting of the package resulting from excess pressure due to the giving off of water vapor, as the prebaked bread, packed and sterilized as soon as it leaves the oven, runs only little risk of being contaminated by the outer medium, on the one hand due to the short time that this bread is kept in the outside air, and, on the other hand, being given that the bread remains, during this short time, at a temperature very substantially close to pasteurization temperature. In addition, during the period separating the exit from the oven and packing, the crust of the prebaked bread, remaining hot and relatively dry (by contrast to the heart of the bread which is very moist), still constitutes a barrier against attack and penetration of the outside germs; it is only with the cooling and moistening of the crust that the prebaked bread becomes, in fact, sensitive to the deposit and attack of the outside germs; now, the bread prebaked according to the technique of the invention is never subjected to this phase of cooling and re-moistening of the crust and the bread conserves its barrier and its immunity up to sterilization.

According to the invention, the prebaked bread is subjected to a continuous process, in an uninterrupted chain from kneading to packaging without subjecting the bread to a dead cooling time between the first prebaked phase and the second packaging and sterilization phase, according to the prior known techniques.

The abrupt break in the thermal curve of the preparation of the bread as was previously used in thus eliminated, and this has a two-fold advantage.

The packed bread is thus sterilized in a relatively short time, with the result that a prolonged excess pressure due to giving off of vapor inside the package is avoided, as well as a source of the latter in the sterilization phase.

In the second place, the prebaked bread retains its optimum rate of humidity by avoiding the considerable loss of humidity which would accompany a more prolonged drying and rest phase between the prebaking and packaging bread is thus obtained whose humidity content makes it possible, during the final baking phase by the consumer, to obtain both a crusty, freshly caramelized crust and a soft, non-dry inside of the bread.

BRIEF DESCRIPTION OF THE DRAWINGS

The invention will be more readily understood on reading the following description with reference to the accompanying drawings, in which.

DESCRIPTION OF A PREFERRED EMBODIMENT OF THE INVENTION

To carry out the process according to the invention, the dough is firstly prepared and worked in conventional manner, and bread pieces are formed.

Figure 1:
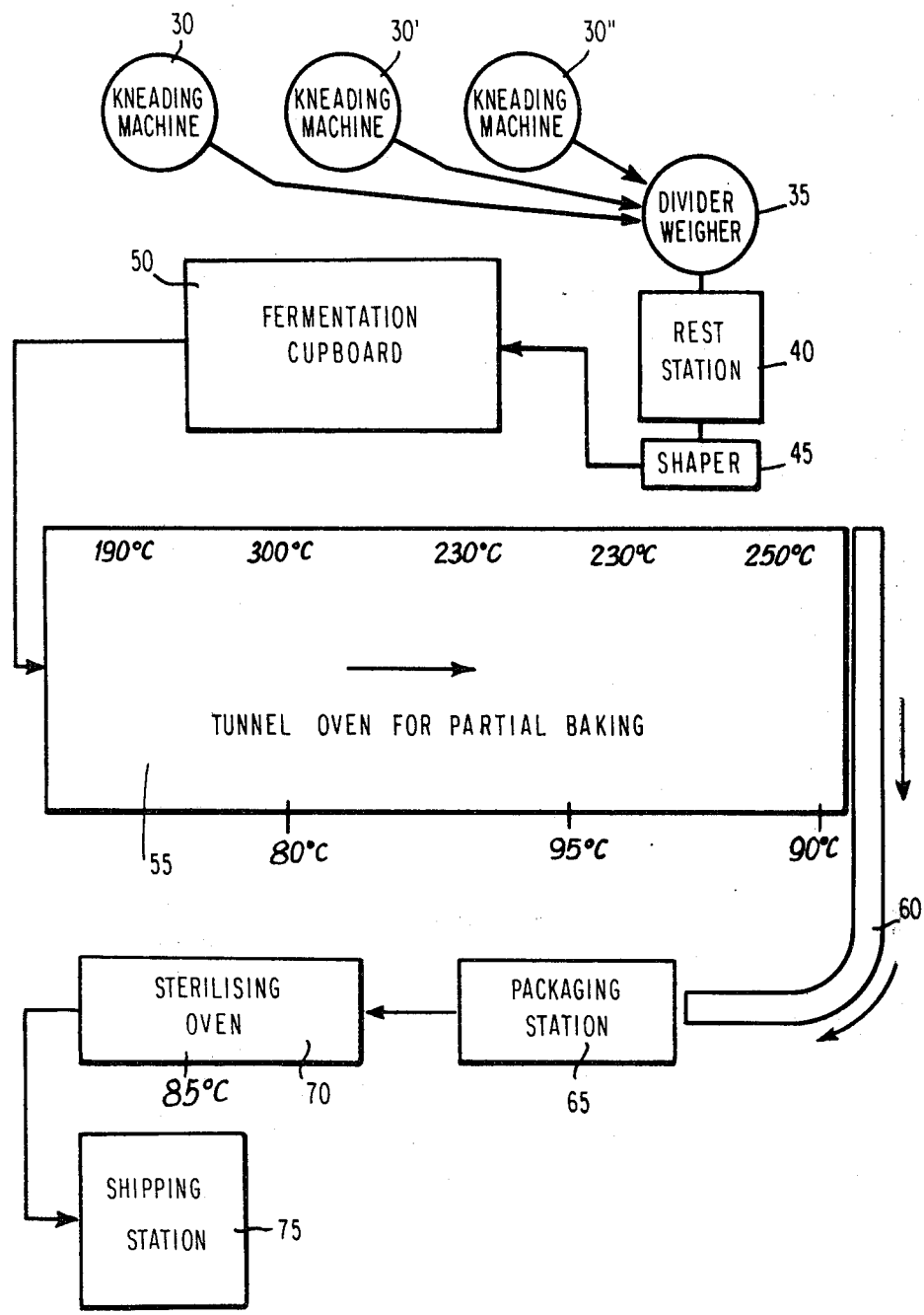
FIG. 1 shows a schematic view of a preferred bread production and package lines according to the invention.

Referring now to the drawings, FIG. 1 shows that the dough is prepared in a set of mechanical kneaders 30, 30' and 30" and is conveyed towards a dividing weighing machine 35 which delivers unitary portions of dough corresponding to the quantities necessary for forming a loaf of bread or roll; the dough portions wait in a rest device 40 for a few minutes before being delivered to an apparatus 45 which shapes the bread pieces; the latter are then introduced into a fermentation cupboard 50 to undergo the normal fermentation cycle and after the fermentation phase the bread pieces are directed towards a tunnel oven 55 to be partially baked.

The invention is more particularly used for preparing so-called French bread, whose dough is exclusively composed of flour, water, salt and yeast, to the exclusion of any other ingredient, such as in particular fats or sugars; in particular the bread of this type contains no preservative.

Figure 2:
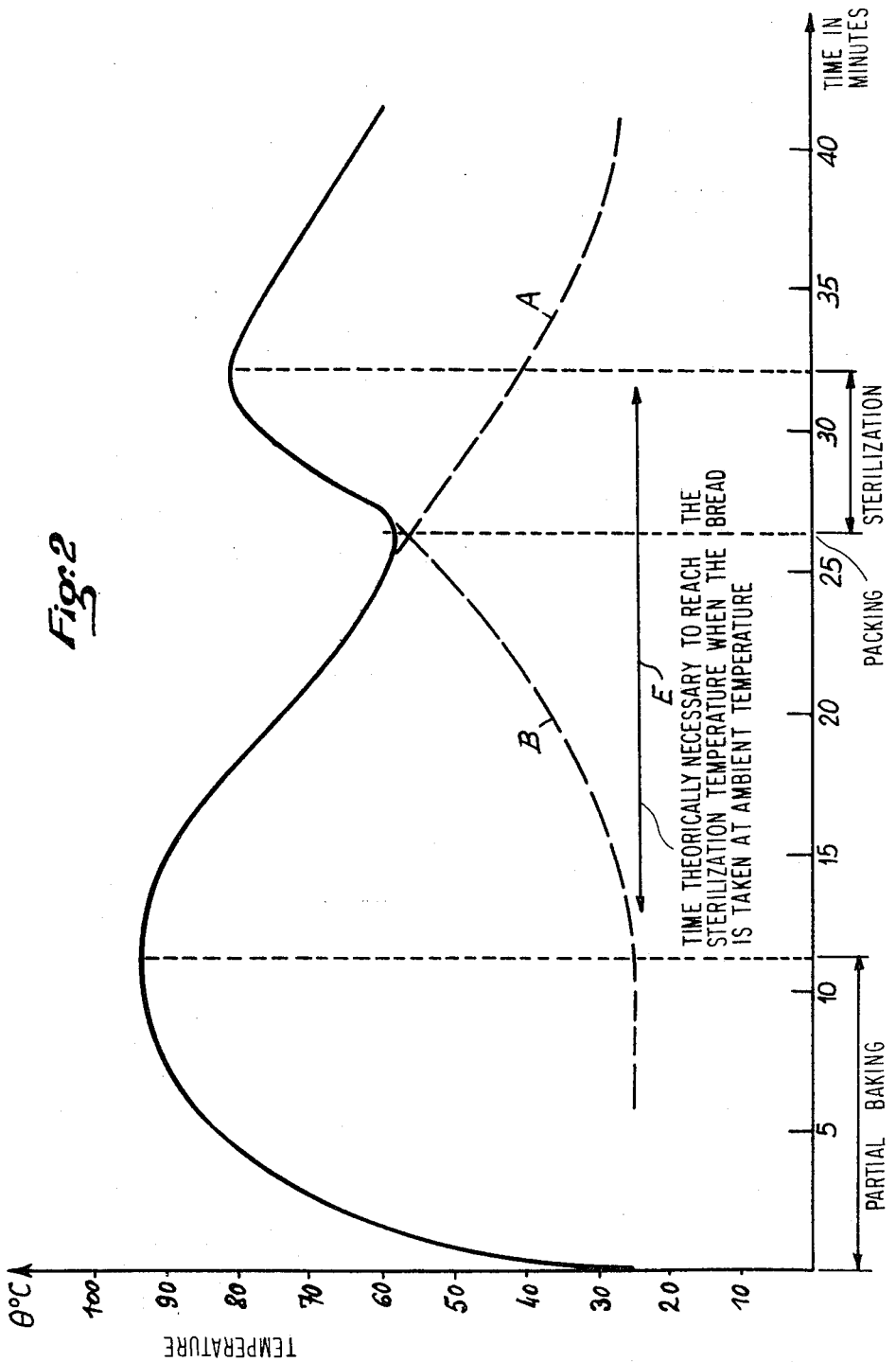
FIG. 2 shows the thermal curve of the prebaked bread along the whole continuous process from entering the oven to leaving the sterilizer.
Figure 3:
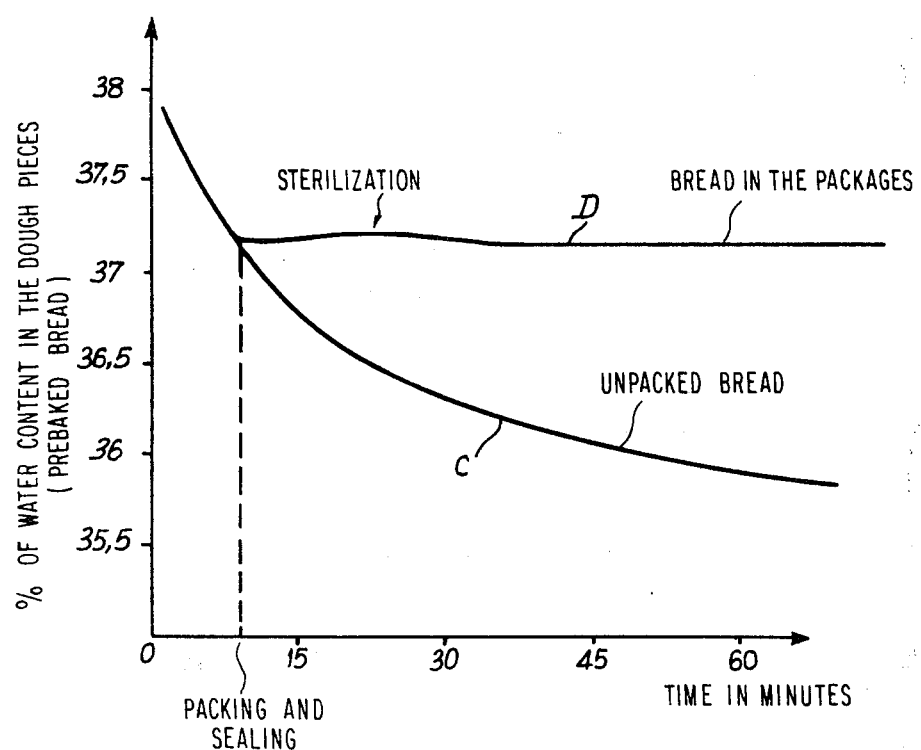
FIG. 3 shows the curve of natural evolution of the average water content of the prebaked bread in normal cooling phase at ambient temperature at the exit of the prebaking oven, said curve compared with the evolution of the water content of the prebaked bread in the process of manufacture according to the invention.

FIG. 2 shows the bread temperatures of the bread as it passes through the oven 55; the solid line being the surface temperature and the broken line being the temperature measured at the heart of the bread pieces as they advance in the tunnel oven.

The passage in the oven generally takes the bread pieces to a temperature lower than 100° C. which may be between 70° and 98° C.; under such conditions, the baking time is between 10 and 15 minutes.

A partly baked bread piece is thus obtained on leaving the oven, which is pale, almost white in color; this corresponds to a partial structuration of the bread, the starch then being gelatinized to a large extent; however, the outer crust has not undergone the carmelization phase corresponding to the formation of a rigid brown crust.

By way of comparison, the normal baking time for obtaining a totally baked bread would, under the same conditions, be of the order of 20 minutes.

The bread thus obtained can, in fact, be consumed, the structure of the inside of the bread already being largely obtained; however, its water content is substantially greater than that of the completely baked bread, which, added to the absence of totally formed and caramelized crust, does not give it the attractiveness and taste of the totally baked bread.

It is only at the stage of consumption, and immediately before consumption, that the prebaked bread will be subjected to a final heat treatment which will provoke, with the formation of the crust, the final baking of the inside and the obtaining of totally baked bread identical in presentation and taste to traditional bread which leaves the baker's oven.

On leaving the oven 55, the prebaked bread is immediately conveyed towards the packing and sterilizing device.

In fact, according to the invention, the packing and sterilization station is located immediately downstream of the baking phase in the oven 55.

The prebaked bread is conveyed on a conveyor belt 60 which directs it towards the packaging station 65, the conveyor belt 60 constituting a simple buffer between the rate of supply of the oven and the packaging station.

In the packing cycle 65, the bread pieces are placed, either individually or preferably in pairs or in threes, in a bag made of synthetic material which is suitable for contact with foodstuffs, for example a film of polypropylene.

The prebaked bread pieces are accordingly packaged in a period of time following the exit from the oven, of between 9 and 15 minutes.

The bread pieces thus packaged are still in the hot state, having undergone only a minimum cooling period from their exit from the oven; this cooling may vary, as a function of the rate of supply by the oven and the rate of operation of the packaging station; however, it is sought, according to the invention, to bring the rates of operation of the two stations in synchronism as much as possible so as to reduce to a minimum the buffer stock between the exit from the oven and the packaging, so as to reduce the period of waiting of the bread pieces between the exit from the oven and the packaging phase.

Thus, the temperature at the heart of the bread pieces upon packing will be close to 70° C. and in principle should not go below 50° C.

Under these conditions, the temperature at the heart of the bread pieces remains close to a pasteurization temperature.

Under these conditions, the bread pieces are only slightly exposed to the attack of outside media and particularly the deposit of germs, between leaving the oven and the packaging and sterilizing phase.

It may be considered that the bread at the exit of the ovens is in the sterile state, the temperature at the heart of the bread pieces being between 90° and 98° C.

Figure 4:
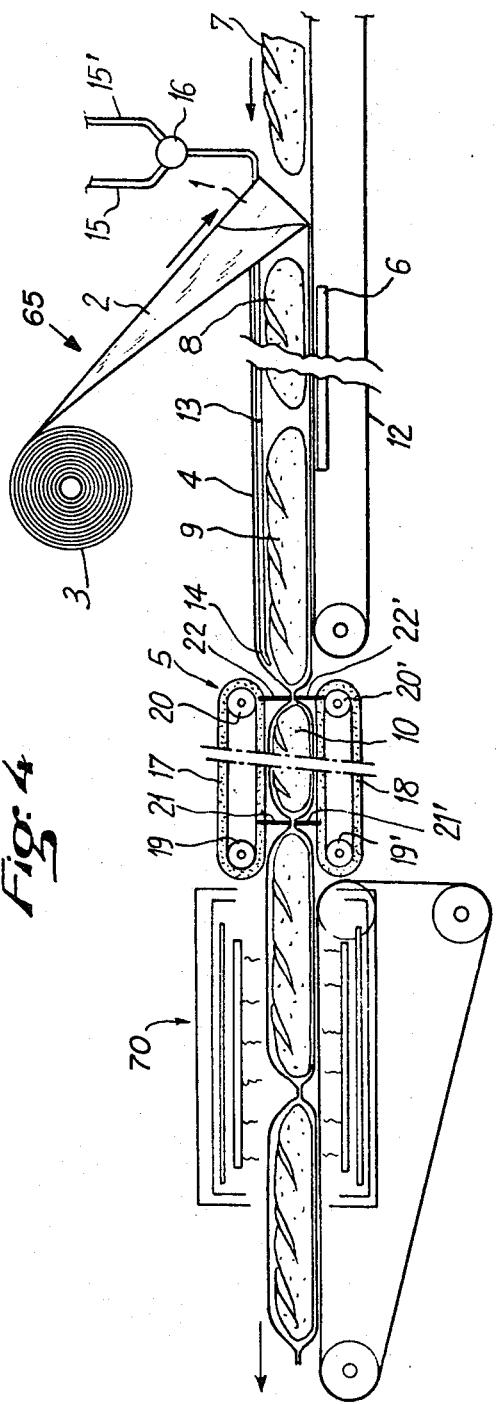
FIG. 4 is a schematic vertical cross section of a preferred form of packaging apparatus.

The device shown in FIG. 4 and intended for packing said partially bread pieces, comprises a shaping device 1 on which is guided a continuous film 2 of a heat-weldable synthetic material delivered from reel 3; this film, after passage on the shaping device 1, forms a tubular sheath 4 which is continuously conveyed from the shaping device 1 to the sealing device 5. The edges of the sheath which join after passage on the shaping device 1 are welded by passage on a median and lower welding rail 6, of known type. The space inside the sheath, between the shaping device 1 and the welding device 5, extends over a length which is sufficiently long to produce the adequate conditions of tightness enabling the rolls to be placed in vacuo at the level of the transverse closure and sealing device 5.

The rolls 7, 8, 9, 10 are conveyed at regular intervals by a conveyor belt 12 to inside the sheath 4, passing through the orifice formed by the inlet of the shaping device 1; under these conditions, the rolls 7, 8, 9, 10 move in synchronixm with the sheath from the shaping device to the transverse sealing device 5.

In the inner space of the sheath there is provided a small pipe 13 terminating at its end by a preferably widened and flattened hosepiece 14, located inside the sheath, in the zone immediately preceding the transverse sealing device 5.

The small pipe 13 leaves the inner space of the sheath, passing through the orifice of the shaping device 1 and it terminates at a three-way valve 16 connected on the one hand to a pipe 15 leading to a source of vacuum and on the other hand to a second pipe 15' leading to a source of neutral gas such as nitrogen and $CO_2$.

The transverse sealing device 5 is composed of two upper and lower conveyor belts 17 and 18 respectively, maintained and driven by the rollers 19, 19', 20 20', the conveyors being constituted by a belt coated with a non-stick material forming a shock-absorbing cushion, for example a foam made of synthetic material; each of the upper and lower conveyors 17 and 18 comprises transverse heat-welding bars 21, 22 and 21' 22'. These bars are disposed transversely and are symmetrical from one conveyor to the other so that they come into register, as may be seen in FIG. 4, and imprison therebetween the transverse section of the sheath 4; these bars consequently ensure the contact and heating, with a view to its heat-welding, of the wall of the sheath and the two bars forming heat-welding jaws accompany the sheath during the time corresponding to a half-run, i.e. to a forward run of the conveyor, the return of the bars from their downstream position to their upstream position being ensured by the outside part of the conveyor.

Under these conditions, the bars return at regular intervals into register at the inlet of the sealing device and they approach one another until they imprison the transverse section of the wall of the sheath, ensuring closure of said latter at regular intervals and thus shaping individual bags containing one or more rolls.

The small pipe 13 is alternately placed in communication, due to the maneuvering of the three-way valve 16, with the source of vacuum via pipe 15 and with the source of gas 15' such as nitrogen; the manoeuvring of the three-way valve is automatic and is controlled by a servo-control relay of electric, pneumatic or other type, so that the manoeuvre of the three way valve occurs at regular periods corresponding to the movements of the transverse heat-welding bars constituting the device closing the bags.

Thus, during the greater part of a cycle corresponding to the formation of a bag, the pipe 13 is placed in communication via the three-way valve with the source of vacuum; under these conditions, the zone of the sheath located immediately upstream of the sealing device, i.e. the zone located beneath the widened nose-piece 14, is placed under partial vacuum.

In fact, the rolls which are waiting in the space inside the sheath from the sealing device 5 to the shaping device 1, substantially fill the transverse section of the sheath and thus constitute sufficient sealing buffers or screens opposing the immediate arrival of outer air which may compensate the evacuation; thus, a sufficient partial vacuum for packing needs is obtained in the space inside the sheath immediately in front of the closure zone; in this phase of the cycle, the nose-piece 14 sucks a large part of the air inside the sheath, thus degassing the porous matter constituted by the rolls contained therein and eliminating a large part of the atmospheric oxygen present in the cells of said rolls.

In the subsequent phase which corresponds to the end of the bag-forming cycle, the jaws formed by the heat-welding bars 22, 22' are then ready to tighten on the walls of the sheath, closing on themselves and consequently closing the bag being formed; at this state, the three-way valve 16 places the inner pipe 13 in communication, for a limited period of time, with the source of nitrogen 15' and nitrogen is injected in the sheath in a zone corresponding to the bag which will be closed; under these conditions, when the jaws or heat-welding bars 22, 22' join each other, closing the bag and imprisoning the roll, the space inside the bag has had a large amount of atmospheric oxygen removed therefrom and has received in partial compensation an injection of neutral gas such as nitrogen, which will avoid any phenomenon of oxidation of the product whilst it is being kept.

Subsequently, as is seen in FIG. 4, the individual bags which constitute a continuous chain are conveyed towards a tunnel oven 25, of the infrared radiation of micro-wave type, or a combination of the two, to ensure the final heat treatment for sterilization purposes; the packed rolls, leaving the oven, are thus sterilized and enclosed in an airtight packing containing little or no oxygen and they are therefore ready for a long conservation, a high quality taste being maintained and any deterioration of the rolls by germ action being avoided, as the rolls are in fact protected from germs by the sealed and air-tight packing.

Figure 5:
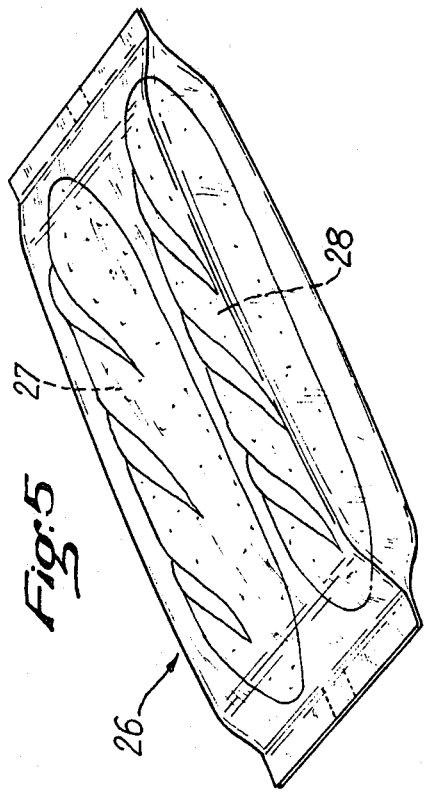
FIG. 5 is a perspective view of an example of a finished partially baked and packaged bread product according to the invention.

FIG. 5 shows an individual package 26 having left the oven and containing two rolls 27 and 28 side by side in a sealed film. This presumes that the rolls advance in twos on the conveyor 12.

When it is desired to consume the rolls 27 and 28, possibly having kept them several weeks or months in the package 26, said rolls are removed from their package 26, placed in a conventional domestic oven and heated to about 250° C. for a duration of about 10 minutes. The crust of said rolls takes its usual color, baking is terminated and the bread obtained when the tolls are removed from the oven has the same appearance as the fresh crusty bread brought at the baker's.

Since the final packaging and sterilizing phase follows immediately, it is understood that this final sterilization may be conducted in extremely rapid conditions being given, on the one hand, the virtually sterile state of the bread pieces when they are introduced into the sterilization phase and, on the other hand, being given the already high temperature at which the bread pieces are maintained, this enables the final sterilization in the packages to be carried out in a very short time.

In accordance with the invention, the individual packages, after the bread pieces have been introduced therein, are subjected to a degasification phase with reinjection of a complementary gas so as to ensure a perfect control of the atmosphere inside the packing.

In this phase, prior to the sealing and closure of the bag, the atmosphere inside the bag is substantially completely evacuated and an atmosphere under partial pressure of a neutral gas and preferably a mixture of nitrogen and carbon dioxide gas is reinjected.

The purpose of the evacuation of the natural atmosphere from the bag is to evacuate from the package the atmospheric oxygen which would be a source of oxidation and particularly the water vapor which is given off from the still hot bread piece; at the same time, a controlled atmosphere is reinjected, constituted by a mixture of nitrogen and carbon dioxide gas. However, this atmosphere is controlled with respect to its composition, on the one hand, and also with respect to its pressure, the quantity of reinjected gas occupying, under atmospheric pressure, only substantially 1/5 to ⅓ of the free volume of the bag around the bread. Under these conditions, when the bag reaches the sterilization station, it occupies a smaller volume with respect to its final volume.

Under these conditions, when the bag is subjected to the sterilization phase, the considerable giving off of water vapor coming from the prebaked bread which contains a great deal of humidity, can be effected, allowing the water vapor to escape into the bag, without exerting an excessive pressure on the walls.

However, the vapor given off during the sterilization phase will subsequently condense; it is important that it may then be reabsorbed by the prebaked bread which thus conserves a constant and optimum rate of humidity; however, a gaseous atmosphere must remain within the bag.

The remanent gaseous atmosphere must enable the outer atmospheric pressure to be balanced while preventing the prebaked bread from collapsing.

Tests carried out by the applicant have shown that the prebaked bread, in the absence of a hard crust, presents an ultimate compressive crushing strength only one third of that of normal bread; in the absence of atmosphere inside the bag, the prebaked bread would therefore experience the atmospheric pressure directly, which would provoke the collapsing of the bread.

The atmosphere injected prior to the sterilization phase also enables an interface to be established between the walls of the film and the walls of the prebaked bread which comprises only a light, non-caramelized crust; this interface, containing humidity, will allow the slow reabsorption of this humidity by the prebaked bread, avoiding the moist walls of the bag bearing on and adhering to the outer walls of the prebaked bread. This contact would create a liquid interface, provoking the decomposition of the light crust of the prebaked bread under the action of the water and the formation of a pasty, sticky layer which would adhere to the walls when the bag is opened, the product then being unpresentable and commercially unacceptable.

Finally, the controlled atmosphere which is injected into the bag, before the sterilization phase, must avoid attacking the prebaked bread during the weeks of conservation; an oxidizing medium is avoided by the action of the nitrogen combined with that of the carbon dioxide gas; the latter, in a moist medium, will produce carbonic acid whose fungicidal and bacteriostatic action is well known.

In fact, the internal atmosphere within the bag, during the conservation period, will contain atmospheric oxygen; this oxygen is in fact contained in the bread during the packaged phase, this oxygen is degasified from the medium constituted by the bread during the sterilization phase and is therefore found with the nitrogen and carbon dioxide gas reinjected in the remanent atmosphere of the bag, while the water vapor degasified during the sterilization phase is then very largely absorbed by the bread during the conservation phase at ambient temperature.

The graph shown in FIG. 2 shows the evolution of the temperature inside the bread and the prebaked bread during the different phases of manufacture and preparation according to the invention.

Due to the invention, the bread piece does not drop to below an average temperature of the order of 70° C. and a minimum of 50° C., between the baking phase and the sterilization phase, this presenting the previously described advantages; the sterilization time is 10 minutes at maximum, when a prebaked bread is taken whose temperature was cooled to about 50° C.; however, this sterilization time may be considerably reduced by adjusting the rate of supply of the packing and sterilization station to the rate of supply of the oven, so as to reduce the quantity stored between the two phases and consequently to bring sterilization closer to the exit of the oven.

The sterilization time thus obtained is therefore considerably less, by more than one half, with respect to the sterilization time necessary for sterilizing normally baked bread. However, if prebaked bread were allowed to return to ambient temperature, sterilization times of up to an hour would be required because its fragility resulting from its absence of physical structure and its high rate of humidity.

Now, these sterilization times would be incompatible with the physical strength of the packaging materials and all of the bags, due to the excessive inner pressure of the water vapor, would burst during the sterilization phase.

The graph of FIG. 2 shows at A in a dashed line, the extension of the thermal curve of the temperature at the heart of the bread pieces if the latter were subjected to a period of cooling; and at B, the dashed line also shows the thermal curve of the rise in temperature at the heart of the bread pieces during the sterilization phase if a bread piece at ambient temperature were taken. This shows that the duration of passage of the package in the sterilizer would have already been more than doubled to bring the temperature at the heart of the bread piece to the sterilization temperature. In fact, this duration should be more than doubled in the event that the bread pieces, had remained at ambient temperature in the outside medium, they would already have been largely subjected to the attack of the outside germs and should therefore undergo a much longer sterilization time.

Graph 3 shows the evolution of the average water content in the prebaked bread in a natural cooling phase at ambient temperature and average humidity (curve C), compared with the evolution of the water content of the prebaked bread in the process of the present invention (curve D).

Curve C shows that the water content in the prebaked bread left in normal cooling phase reduces naturally from a value close to 38 to a value close to 36% after an hour.

This loss of water content constitutes an interruption in the cycle which begins when the bread leaves the exit of the prebaking oven and continues to the household cooker or other location where it will undergo its final baking; it will be understood, in fact, that the purpose of this invention is to allow the user to bring out of the oven baked bread which is virtually identical to, and having all the qualities and properties as, the normally baked bread would have coming out of the baker's oven.

It is therefore an object of the invention to "crystallize" the physical characteristics of the prebaked bread as it leaves the prebaking oven to maintain it as it is until the user introduces it into the household oven and thus finish the total baking, taking the bread substantially in the state in which it was found at the exit of the prebaking oven, the bread having been conserved under stable and unchanged conditions between the prebaking oven and the household oven.

The water content of the prebaked bread is one of the important characteristics of this product; in fact, if the water content is considerably modified and lowered, it will be readily understood that the bread obtained at the final baking phase at the consumer's will be considerably drier than the normal bread sought.

The invention precisely remedies this drawback by avoiding the cooling phase in the open air and ensuring the sterile packing of the bread immediately it leaves the prebaking oven, thus maintaining the rate of humidity and the water content in the prebaked bread under constant conditions.

The loss of water is thus avoided and the bread being enclosed in a hermetic medium, a balance is obtained between the water content of the bread and the remanent atmosphere of the bag which ensures that an optimum water content is maintained within the prebaked bread in the course of conservation.

I claim:

1. Method for producing a bread product wherein dough consisting of flour, water and yeast without artificial preservatives, has been kneaded, shaped into pieces, and allowed to ferment, comprising the steps of:
   introducing said dough pieces into an oven operated at an elevated temperature; partially baking said dough pieces in said oven for a length of time insufficient to fully bake the dough pieces or to form a crust, said length of time being sufficient for the dough pieces to obtain their final structure while retaining substantially their initial coloring;
   introducing the resulting hot pieces directly from the oven into flexible packages of water impermeable material, said packages containing an added neutral gaseous atmosphere and hermetically sealing the packages under partial vacuum without substantial delay and before substantial lowering of the temperature and moisture content of the bread pieces, said vacuum eliminating a large part of the atmospheric oxygen present in the cells of the bread, whereby during the sterilizing process phase, the water vapor comes solely from the heart of the bread and will be reabsorbed by the bread after cooling and;
   sterilizing said bread pieces at an elevated temperature while in said hermetically sealed packages.

2. Method for producing a bread product as defined in claim 1, wherein the length of time of said partial baking is less than one-half the normal baking time for fully baking the bread pieces.

3. Method for producing a bread product as defined in claim 1, wherein the temperature of said bread pieces is maintained above about 50° C. between said partial baking step and introduction into said hermetically sealed packages.

4. Method for producing a bread product as defined in claim 3, wherein said maintained temperature is solely the result of heat retained from said partial baking.

5. Method for producing a bread product as defined in claim 1, wherein the volume of the atmosphere within said sealed packages prior to sterilization is less than the full capacity of the packages and the volume of vapor released from the bread pieces during sterilization is insufficient to exceed the capacity of said packages.

6. Method for producing a bread product as defined in claim 1, wherein said partial baking step is completed when the temperature at the heart of the dough pieces is between about 70° C. and 98° C.

7. Method for producing a bread product as defined in any one of claims 1, 2, 3, 4, 5, or 6, wherein after a period of storage of the dough pieces in a sealed package for a period of at least one month at ambient temperature, a bread product having substantially all of the characteristics of freshly baked bread is obtained by removing the bread pieces from said package and subjecting them to customary baking temperature in an oven for a period of time sufficient to provide them with a fresh, rigid, brown caramelized crust and a soft moist interior.

8. A method for producing a bread product wherein dough consisting of flour, water and yeast without artificial preservatives has been kneaded, shaped into pieces, allowed to ferment and partially baked in an oven at a temperature and for a length of time sufficient only to raise the temperature of the hearts of the bread pieces to about between 70° C. and 98° C. and the bread pieces have become structured but without substantial change in coloration, comprising the steps of:

continuously forming an elongated tubular sheath from a supply of flexible water impermeable plastic heat-sealable film by continuously drawing the opposite margins of said film towards each other to be sealed along a continuous line by means of a shaping machine;

introducing into said sheath successive pieces of said partially baked hot dough directly from said oven before the temperature of said bread pieces has fallen below about 50° C.;

introducing into said sheath an added neutral gas;

transversely sealing said film at intervals to form hermetically sealed packages each containing at least one dough piece while removing water vapor prior to completion of each package, to create a partial vacuum;

subjecting said dough pieces to a heat treatment while in said sealed packages to ensure sterilization of the dough pieces;

the vapor released from the dough pieces resulting from said sterilization being insufficient to rupture said packages, said vacuum eliminating a large part of the atmospheric oxygen present in the cells of the bread, whereby during the sterilizing process phase, the water vapor comes solely from the heart of the bread and will be reabsorbed by the bread after cooling.

9. A packaged bread product produced in accordance with the method of any one of claims 1, 2, 3, 4, 5, 6, 7 or 8.

* * * * *